United States Patent
Badaye

(10) Patent No.: US 8,638,316 B2
(45) Date of Patent: Jan. 28, 2014

(54) TWO PRONG CAPACITIVE SENSOR PATTERN

(75) Inventor: Massoud Badaye, Sunnyvale, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 306 days.

(21) Appl. No.: 13/247,867

(22) Filed: Sep. 28, 2011

(65) Prior Publication Data

US 2012/0229417 A1  Sep. 13, 2012

Related U.S. Application Data

(60) Provisional application No. 61/452,006, filed on Mar. 11, 2011.

(51) Int. Cl.
  *G06F 3/045* (2006.01)
(52) U.S. Cl.
  USPC ...... 345/174; 345/173; 178/18.06; 178/19.03
(58) Field of Classification Search
  USPC ............. 345/156, 173, 174; 178/18.06, 19.03
  See application file for complete search history.

(56) References Cited

U.S. PATENT DOCUMENTS

| | | | |
|---|---|---|---|
| 6,627,154 B1 * | 9/2003 | Goodman et al. | 422/82.01 |
| 7,663,607 B2 | 2/2010 | Hotelling et al. | |
| 7,920,129 B2 | 4/2011 | Hotelling et al. | |
| 7,940,251 B2 | 5/2011 | Hashida | |
| 7,965,281 B2 | 6/2011 | Mackey | |
| 8,217,916 B2 * | 7/2012 | Anno | 345/174 |
| 8,410,795 B1 * | 4/2013 | Peng et al. | 324/658 |
| 2002/0015024 A1 * | 2/2002 | Westerman et al. | 345/173 |
| 2002/0098119 A1 * | 7/2002 | Goodman | 422/82.01 |
| 2007/0139395 A1 | 6/2007 | Westerman et al. | |
| 2008/0225015 A1 | 9/2008 | Hashida | |

(Continued)

OTHER PUBLICATIONS

U.S. Appl. No. 13/172,749: "Self Shielding Capacitance Sensing Panel" Min Chin Chai et al., filed Jun. 29, 2011; 43 pages.
U.S. Appl. No. 13/198,717: "Lattice Structure for Capacitance Sensing Electrodes" Min Chin Chai et al., filed Aug. 5, 2011; 45 pages.
International Search Report for International Application No. PCT/US11/66509 dated Apr. 19, 2012; 2 pages.
USPTO Notice of Allowance for U.S. Appl. No. 13/172,749 dated Mar. 19, 2013; 10 pages.
USPTO Notice of Allowance for U.S. Appl. No. 13/172,749 dated May 9, 2013; 6 pages.
Written Opinion of the International Searching Authority for International Application No. PCT/US11/66509 mailed Apr. 19, 2012; 6 pages.

*Primary Examiner* — Joe H Cheng

(57) ABSTRACT

One embodiment of a capacitive sensor array may comprise a first plurality of sensor elements and a second sensor element capacitively coupled with each of the first plurality of sensor elements. The second sensor element may further comprise a first main trace and a second main trace, where the first main trace and the second main trace intersect each of the first plurality of sensor elements, and where each of the main traces cross at least one of a plurality of unit cells associated with the second sensor element. The second sensor element may also comprise a connecting subtrace electrically coupled to both the first main trace and the second main trace, and within each unit cell, at least one primary subtrace branching away from the first main trace or the second main trace.

20 Claims, 10 Drawing Sheets

(56) References Cited

U.S. PATENT DOCUMENTS

| | | |
|---|---|---|
| 2009/0051863 A1 | 2/2009 | Meisner |
| 2009/0159344 A1* | 6/2009 | Hotelling et al. .......... 178/18.06 |
| 2010/0044122 A1 | 2/2010 | Sleeman et al. |
| 2010/0045632 A1 | 2/2010 | Yilmaz et al. |
| 2010/0059294 A1* | 3/2010 | Elias et al. ................. 178/18.06 |
| 2010/0182275 A1* | 7/2010 | Saitou ........................... 345/174 |
| 2010/0224424 A1* | 9/2010 | Kasajima .................. 178/18.06 |
| 2010/0292945 A1* | 11/2010 | Reynolds et al. ................ 702/65 |
| 2010/0302206 A1* | 12/2010 | Yu et al. ......................... 345/174 |
| 2010/0328255 A1 | 12/2010 | Ishizaki et al. |
| 2011/0261003 A1* | 10/2011 | Lee et al. ....................... 345/174 |
| 2011/0316567 A1* | 12/2011 | Chai et al. ..................... 324/686 |
| 2012/0044193 A1* | 2/2012 | Peng et al. ..................... 345/174 |
| 2012/0044198 A1 | 2/2012 | Chai et al. |
| 2012/0133611 A1* | 5/2012 | Chai et al. ..................... 345/174 |
| 2012/0229417 A1 | 9/2012 | Badaye |
| 2013/0169582 A1* | 7/2013 | Ryshtun ........................ 345/174 |

* cited by examiner

TWO PRONG CAPACITIVE SENSOR PATTERN

RELATED APPLICATIONS

This application claims the benefit of U.S. Provisional Application No. 61/452,006, filed on Mar. 11, 2011, which is hereby incorporated by reference.

TECHNICAL FIELD

This disclosure relates to the field of touch-sensors and, in particular, to trace patterns of elements in capacitive touch-sensor arrays.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes which contain a collection of sensor elements that detect the position of one or more conductive objects, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch windows, touch panels, or touchscreen panels, are transparent display overlays which are typically either pressure-sensitive (resistive or piezoelectric), electrically-sensitive (capacitive), acoustically-sensitive (surface acoustic wave (SAW)) or photo-sensitive (infra-red). The effect of such overlays allows a display to be used as an input device, removing the keyboard and/or the mouse as the primary input device for interacting with the display's content. Such displays can be attached to computers or, as terminals, to networks. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to touch the surface of a touch screen, to select an item from a menu.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

An embodiment of a capacitive sensor array that can be used to implement a touch-sensing surface may include a first plurality of sensor elements and a second plurality of sensor elements. For example, these sets of sensor elements may represent row and column sensor elements. In one embodiment, each of the sensor elements of a first plurality of sensor elements may include at least two main traces, where the main traces are electrically connected to each other by a connecting subtrace. Each of the main traces may also be electrically connected to a primary subtrace branching away from the main trace.

In one embodiment, the first plurality of sensor elements may be receive (RX) sensor elements, while the second plurality of sensor elements may be transmit (TX) sensor elements.

In one embodiment, each of the first plurality of sensor elements may include a number of subsections, where each subsection includes a section of a first main trace and a section of a second main trace. The first main trace section and the second main trace section may be electrically connected by a connecting subtrace, and a primary subtrace may branch from one or both of the first and second main trace sections. Main trace sections of the same sensor element may be electrically connected by one or more bridges. In one embodiment, each unit cell (representing an area associated with a particular pair of intersecting sensor elements) may include two bridges.

In one embodiment, each of the sensor elements of the second plurality of sensor elements has a trace shape that is complementary to the shape of the first plurality of sensor elements. For example, the second plurality of sensor elements may be shaped to substantially fill the space left by the first plurality of sensor elements. In one embodiment, each of the second plurality of sensor elements may comprise a core trace area, which is a relatively large trace serving as a low-resistance current path.

Figure 1:
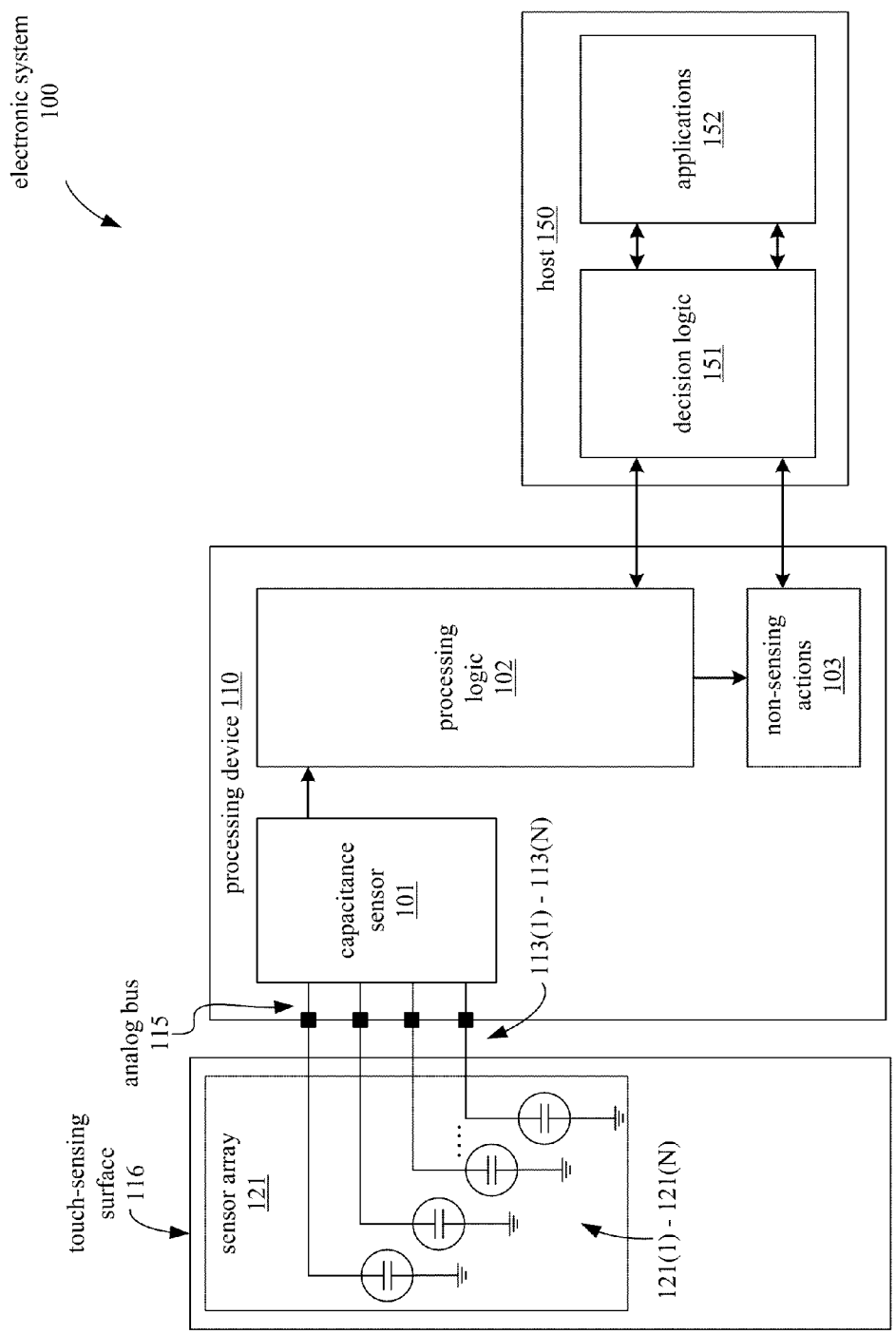
FIG. 1 is a block diagram illustrating an embodiment of an electronic system that processes touch sensor data.

FIG. 1 illustrates a block diagram of one embodiment of an electronic system 100 including a processing device 110 that may be configured to measure capacitances from a touch sensing surface 116 including a capacitive sensor array as described above. The electronic system 100 includes a touch-sensing surface 116 (e.g., a touchscreen, or a touch pad) coupled to the processing device 110 and a host 150. In one embodiment, the touch-sensing surface 116 is a two-dimensional user interface that uses a sensor array 121 to detect touches on the surface 116.

In one embodiment, the sensor array 121 includes sensor elements 121(1)-121(N) (where N is a positive integer) that are disposed as a two-dimensional matrix (also referred to as an XY matrix). The sensor array 121 is coupled to pins 113(1)-113(N) of the processing device 110 via one or more analog buses 115 transporting multiple signals. In this embodiment, each sensor element 121(1)-121(N) is represented as a capacitor.

In one embodiment, the capacitance sensor 101 may include a relaxation oscillator or other means to convert a capacitance into a measured value. The capacitance sensor 101 may also include a counter or timer to measure the oscillator output. The processing device 110 may further include software components to convert the count value (e.g., capacitance value) into a sensor element detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance sensor 101 may be evaluating other measurements to determine the user interaction. For example, in the capacitance sensor 101 having a sigma-delta modulator, the capacitance sensor 101 is evaluating the ratio of pulse widths of the output, instead of the raw counts being over or under a certain threshold.

In one embodiment, the processing device 110 further includes processing logic 102. Operations of the processing logic 102 may be implemented in firmware; alternatively, it may be implemented in hardware or software. The processing logic 102 may receive signals from the capacitance sensor 101, and determine the state of the sensor array 121, such as whether an object (e.g., a finger) is detected on or in proximity to the sensor array 121 (e.g., determining the presence of the object), where the object is detected on the sensor array (e.g., determining the location of the object), tracking the motion of the object, or other information related to an object detected at the touch sensor.

In another embodiment, instead of performing the operations of the processing logic 102 in the processing device 110, the processing device 110 may send the raw data or partially-processed data to the host 150. The host 150, as illustrated in FIG. 1, may include decision logic 151 that performs some or all of the operations of the processing logic 102. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing logic 102 may be implemented in the decision logic 151, the applications 152, or in other hardware, software, and/or firmware external to the processing device 110. In some other embodiments, the processing device 110 is the host 150.

In another embodiment, the processing device 110 may also include a non-sensing actions block 103. This block 103 may be used to process and/or receive/transmit data to and from the host 150. For example, additional components may be implemented to operate with the processing device 110 along with the sensor array 121 (e.g., keyboard, keypad, mouse, trackball, LEDs, displays, or other peripheral devices).

The processing device 110 may reside on a common carrier substrate such as, for example, an integrated circuit (IC) die substrate, or a multi-chip module substrate. Alternatively, the components of the processing device 110 may be one or more separate integrated circuits and/or discrete components. In one embodiment, the processing device 110 may be the Programmable System on a Chip (PSoC™) processing device, developed by Cypress Semiconductor Corporation, San Jose, Calif. Alternatively, the processing device 110 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 110 may be a network processor having multiple processors including a core unit and multiple micro-engines. Additionally, the processing device 110 may include any combination of general-purpose processing device(s) and special-purpose processing device(s).

In one embodiment, the electronic system 100 is implemented in a device that includes the touch-sensing surface 116 as the user interface, such as handheld electronics, portable telephones, cellular telephones, notebook computers, personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, the electronic system 100 may be used in other types of devices. It should be noted that the components of electronic system 100 may include all the components described above. Alternatively, electronic system 100 may include only some of the components described above, or include additional components not listed herein.

Figure 2:
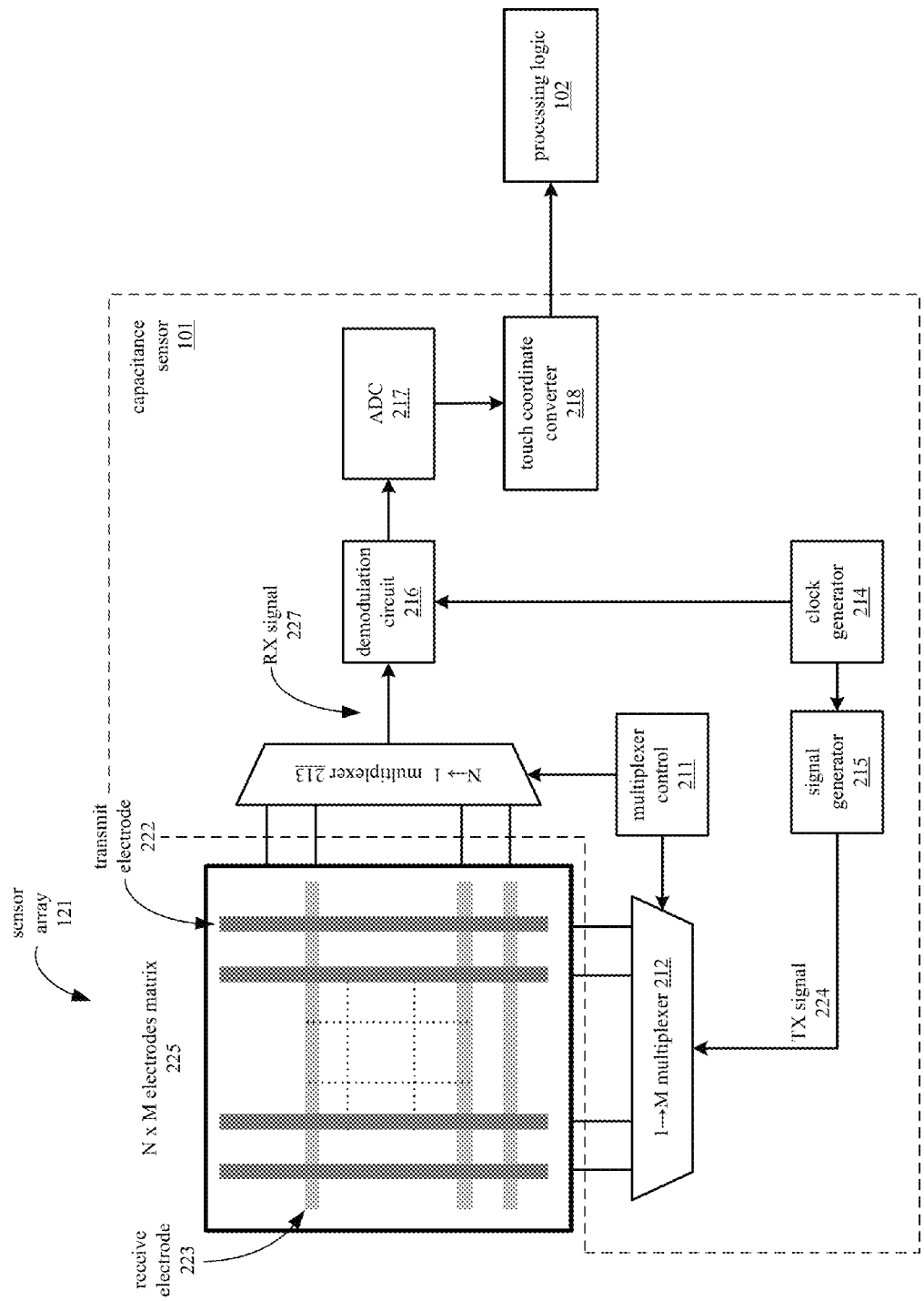
FIG. 2 is a block diagram illustrating an embodiment of an electronic system that processes touch sensor data.

FIG. 2 is a block diagram illustrating one embodiment of a capacitive touch sensor array 121 and a capacitance sensor 101 that converts changes in measured capacitances to coordinates indicating the presence and location of touch. The coordinates are calculated based on changes in measured capacitances relative to the capacitances of the same touch sensor array 121 in an un-touched state. In one embodiment, sensor array 121 and capacitance sensor 101 are implemented in a system such as electronic system 100. Sensor array 220 includes a matrix 225 of N×M electrodes (N receive electrodes and M transmit electrodes), which further includes transmit (TX) electrode 222 and receive (RX) electrode 223. Each of the electrodes in matrix 225 is connected with capacitance sensing circuit 201 through multiplexer 212 and multiplexer 213.

Capacitance sensor 101 includes multiplexer control 211, multiplexer 212 and multiplexer 213, clock generator 214, signal generator 215, demodulation circuit 216, and analog to digital converter (ADC) 217. ADC 217 is further coupled with touch coordinate converter 218. Touch coordinate converter 218 may be implemented in the processing logic 102.

The transmit and receive electrodes in the electrode matrix 225 may be arranged so that each of the transmit electrodes overlap and cross each of the receive electrodes such as to form an array of intersections, while maintaining galvanic isolation from each other. Thus, each transmit electrode may be capacitively coupled with each of the receive electrodes. For example, transmit electrode 222 is capacitively coupled with receive electrode 223 at the point where transmit electrode 222 and receive electrode 223 overlap.

Clock generator 214 supplies a clock signal to signal generator 215, which produces a TX signal 224 to be supplied to the transmit electrodes of touch sensor 121. In one embodiment, the signal generator 215 includes a set of switches that operate according to the clock signal from clock generator 214. The switches may generate a TX signal 224 by periodically connecting the output of signal generator 215 to a first voltage and then to a second voltage, wherein said first and second voltages are different.

The output of signal generator 215 is connected with multiplexer 212, which allows the TX signal 224 to be applied to any of the M transmit electrodes of touch sensor 121. In one embodiment, multiplexer control 211 controls multiplexer 212 so that the TX signal 224 is applied to each transmit electrode 222 in a controlled sequence. Multiplexer 212 may also be used to ground, float, or connect an alternate signal to the other transmit electrodes to which the TX signal 224 is not currently being applied. In an alternate embodiment the TX signal 224 may be presented in a true form to a subset of the transmit electrodes 222 and in complement form to a second subset of the transmit electrodes 222, wherein there is no overlap in members of the first and second subset of transmit electrodes 222.

Because of the capacitive coupling between the transmit and receive electrodes, the TX signal 224 applied to each transmit electrode induces a current within each of the receive electrodes. For instance, when the TX signal 224 is applied to transmit electrode 222 through multiplexer 212, the TX signal 224 induces an RX signal 227 on the receive electrodes in matrix 225. The RX signal 227 on each of the receive electrodes can then be measured in sequence by using multiplexer 213 to connect each of the N receive electrodes to demodulation circuit 216 in sequence.

The mutual capacitance associated with each intersection between a TX electrode and an RX electrode can be sensed by selecting every available combination of TX electrode and an RX electrode using multiplexer 212 and multiplexer 213. To improve performance, multiplexer 213 may also be segmented to allow more than one of the receive electrodes in matrix 225 to be routed to additional demodulation circuits 216. In an optimized configuration, wherein there is a 1-to-1 correspondence of instances of demodulation circuit 216 with receive electrodes, multiplexer 213 may not be present in the system.

When a conductive object, such as a finger, approaches the electrode matrix 225, the object causes a decrease in the measured mutual capacitance between only some of the electrodes. For example, if a finger is placed near the intersection of transmit electrode 222 and receive electrode 223, the presence of the finger will decrease the charge coupled between electrodes 222 and 223. Thus, the location of the finger on the touchpad can be determined by identifying the one or more receive electrodes having a decrease in measured mutual capacitance in addition to identifying the transmit electrode to which the TX signal 224 was applied at the time the decrease in capacitance was measured on the one or more receive electrodes.

By determining the mutual capacitances associated with each intersection of electrodes in the matrix 225, the presence and locations of one or more conductive objects may be determined. The determination may be sequential, in parallel, or may occur more frequently at commonly used electrodes.

In alternative embodiments, other methods for detecting the presence of a finger or other conductive object may be used where the finger or conductive object causes an increase in measured capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined based on the locations of one or more electrodes at which a change in measured capacitance is detected.

The induced current signal 227 is integrated by demodulation circuit 216. The rectified current output by demodulation circuit 216 can then be filtered and converted to a digital code by ADC 217.

A series of such digital codes measured from adjacent sensor or intersections may be converted to touch coordinates indicating a position of an input on touch sensor array 121 by touch coordinate converter 218. The touch coordinates may then be used to detect gestures or perform other functions by the processing logic 102.

In one embodiment, the capacitance sensor 101 can be configured to detect multiple touches. One technique for the detection and location resolution of multiple touches uses a two-axis implementation: one axis to support rows and another axis to support columns. Additional axes, such as a diagonal axis, implemented on the surface using additional layers, can allow resolution of additional touches.

Figure 3A:
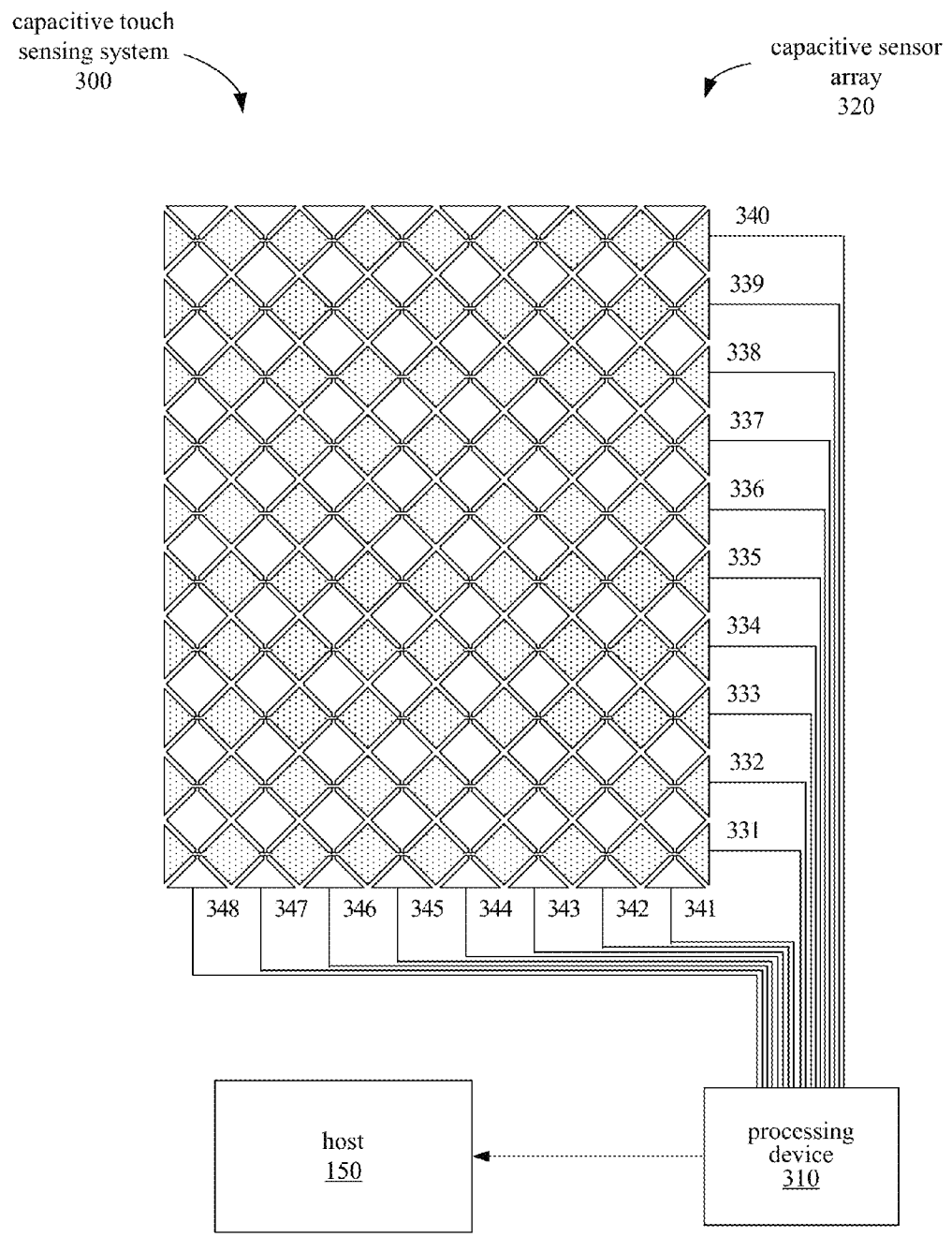
FIG. 3A illustrates an embodiment of a capacitive sensor array having a diamond pattern.

FIG. 3A illustrates an embodiment of a capacitive touch sensing system 300 that includes a capacitive sensor array 320. Capacitive sensor array 320 includes a plurality of row sensor elements 331-340 and a plurality of column sensor elements 341-348. The row and column sensor elements 331-348 are connected to a processing device 310, which may include the functionality of capacitance sensor 101, as illustrated in FIG. 2. In one embodiment, the processing device 310 may perform TX-RX scans of the capacitive sensor array 320 to measure a mutual capacitance value associated with each of the intersections between a row sensor element and a column sensor element in the sensor array 320. The measured capacitances may be further processed to determine centroid locations of one or more contacts at the capacitive sensor array 320.

In one embodiment, the processing device 310 is connected to a host 150 which may receive the measured capacitances or calculate centroid locations from the processing device 310.

Figure 3B:
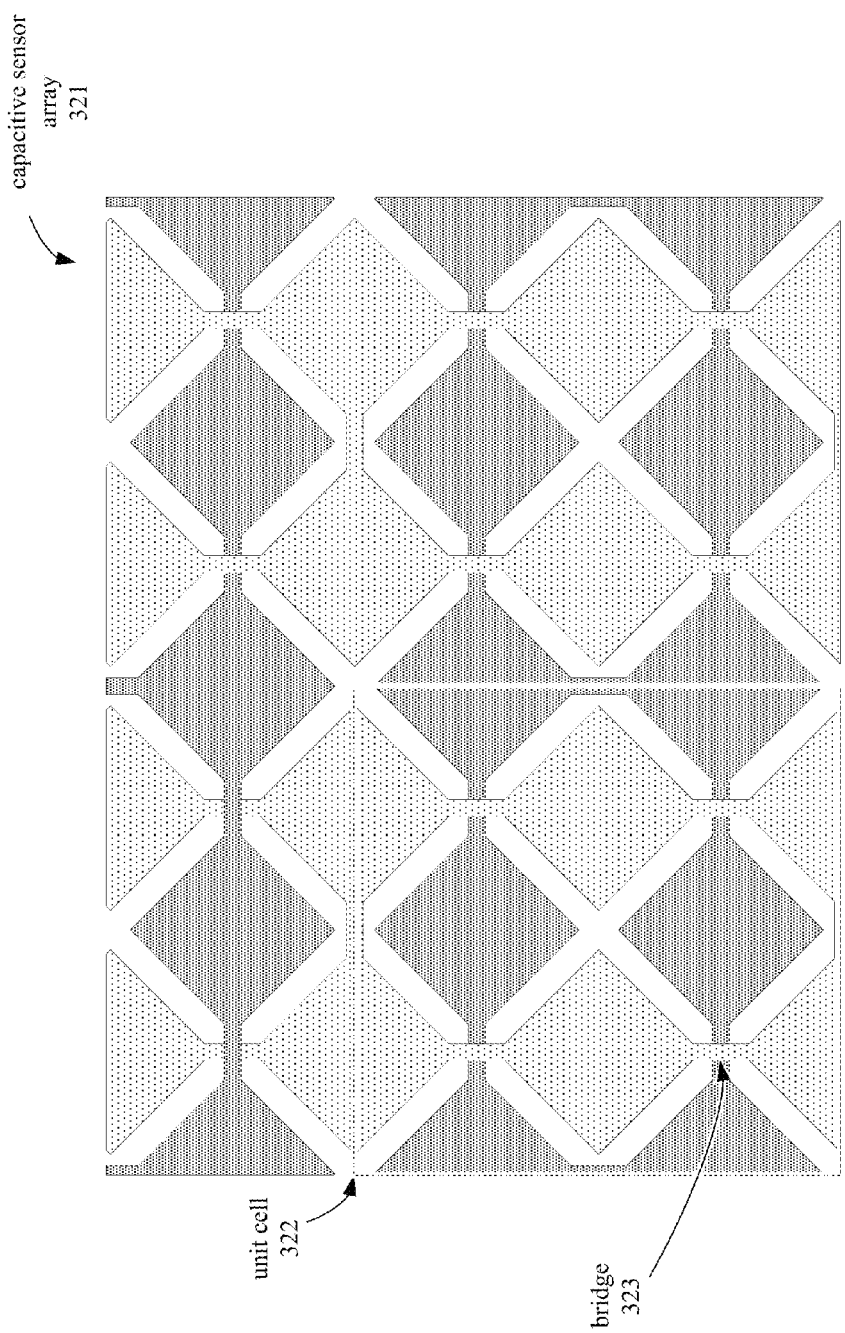
FIG. 3B illustrates a portion of a capacitive sensor array having a diamond pattern, according to an embodiment.

The sensor array 320 illustrated in FIG. 3A includes sensor elements arranged in a diamond pattern. Specifically, the sensor elements 331-348 of sensor array 320 are arranged in a single solid diamond (SSD) pattern. FIG. 3B illustrates a capacitive sensor array 321 having an alternate embodiment of the diamond pattern, which is the dual solid diamond (DSD) pattern. Each of the sensor elements of capacitive sensor array 321 includes two rows or columns of electrically connected diamond shaped traces. Relative to the SSD pattern, the DSD pattern has improved signal disparity characteristics due to an increase in the coupling between TX and RX sensor elements while maintaining the same self-capacitance coupling possible between each sensor element and a conductive object near the sensor element. However, the DSD pattern also increases the number of bridges (such as bridge 323) used to create the pattern, which may result in decreased manufacturing yield. The increased number of bridges may also be visible if metal bridges are used. For example, sensor array 321 includes four bridges within unit cell 322.

In comparison, a dual-prong pattern having two main traces crossing each unit cell may have fewer bridges per unit cell than a DSD pattern, resulting in lower visibility of the sensor array when overlaid on a display. The use of a dual-prong pattern may also result in a higher signal-to-noise ratio (SNR) and improved signal disparity characteristics as compared to the SSD, and Totem pole capacitive sensor array patterns. In one embodiment, the dual-prong pattern may also have a higher manufacturing yield than the single bridged structures such as SSD and Totem pole patterns because of its redundant bridges and redundant connecting subtraces. Specifically, a single failure of a metal bridge or connecting subtrace does not by itself disconnect any portion of the dual-pronged sensor element.

Figure 4:
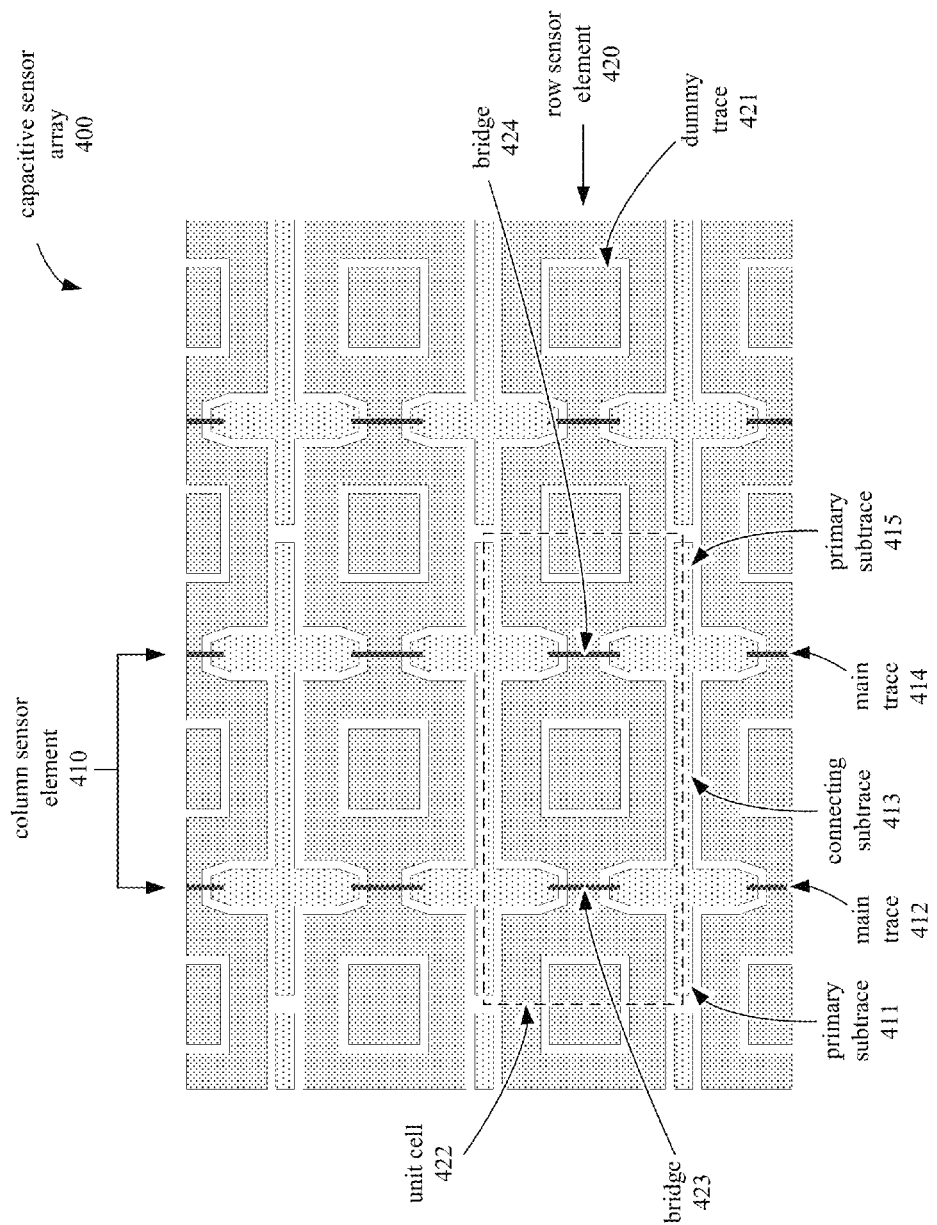
FIG. 4 illustrates a capacitive sensor array having a dual-pronged pattern, according to an embodiment.

FIG. 4 illustrates one embodiment of a capacitive sensor array having a dual-pronged pattern. In one embodiment, the dual-pronged pattern illustrated in FIG. 4 may be used in a single substrate stack-up, or overlaying a display panel in a sensor on lens (SOL) or on-cell stack-up. In one embodiment, an on-cell stack-up may include a sensor array laminated to a color filter glass of an LCD panel. Alternatively, the pattern in FIG. 4 can be directly deposited on the color filter glass of the LCD display.

Capacitive sensor array 400 includes a first plurality of sensor elements, which may include row sensor element 420 and other row sensor elements, and a second sensor element intersecting each of the first plurality of sensor elements, such as column sensor element 410, which intersects each of the row sensor elements.

In one embodiment, the intersections between the sensor elements form a plurality of unit cells, such as unit cell 422. Each of the unit cells is associated with an intersection between a particular pair of sensor elements. For example, unit cell 422 is associated with the intersection between row sensor element 420 and column sensor element 410. In one embodiment, the unit cell 422 designates an area where all the points within the unit cell are nearest to an intersection between the sensor elements 410 and 420 than to any other intersection of sensor elements. For example, sensor element 410 intersects sensor element 420 at the bridges 423 and 424, and all the points within unit cell 422 are nearer to one of these intersections than to any other intersection of sensor elements in the capacitive sensor array 400.

In one embodiment, the second sensor element (column sensor element 410) is capacitively coupled with each of the first plurality of sensor elements (the row sensor elements) at all depletion areas between the sensor elements. In one embodiment, a finger or other conductive object in contact with or in proximity to the surface of the touch-sensing surface interacts with the electric fields formed in the depletion areas between TX and RX sensor elements, illustrated as the gaps between the sensor elements in FIG. 4.

In one embodiment, the second sensor element may include a first main trace and a second main trace, where both of the first main trace and the second main trace intersect each of the first plurality of sensor elements. For example, the column sensor element 410 includes a first main trace 412 and a second main trace 414.

In one embodiment, the first and second main traces of the second sensor element run the entire length of the sensor element. In one embodiment, the first and second main traces cross at least one unit cell associated with the second sensor element. For example, main traces 412 and 414 cross unit cell 422 and run substantially the entire length of sensor element 410.

In one embodiment, the main traces may include one or more bridges that electrically connect sections of the main traces. For example, the sections of main trace 412 are connected together by a number of bridges including bridge 423. Similarly, the sections of main trace 414 are connected together by bridges including bridge 424. In one embodiment, the bridges may span intersections between the column sensor element and the row sensor element. For example, bridges 423 and 424 are positioned at the intersections between sensor elements 410 and 420, and electrically connect portions of sensor element 410 on opposite sides of a portion of sensor element 420.

Figure 5:
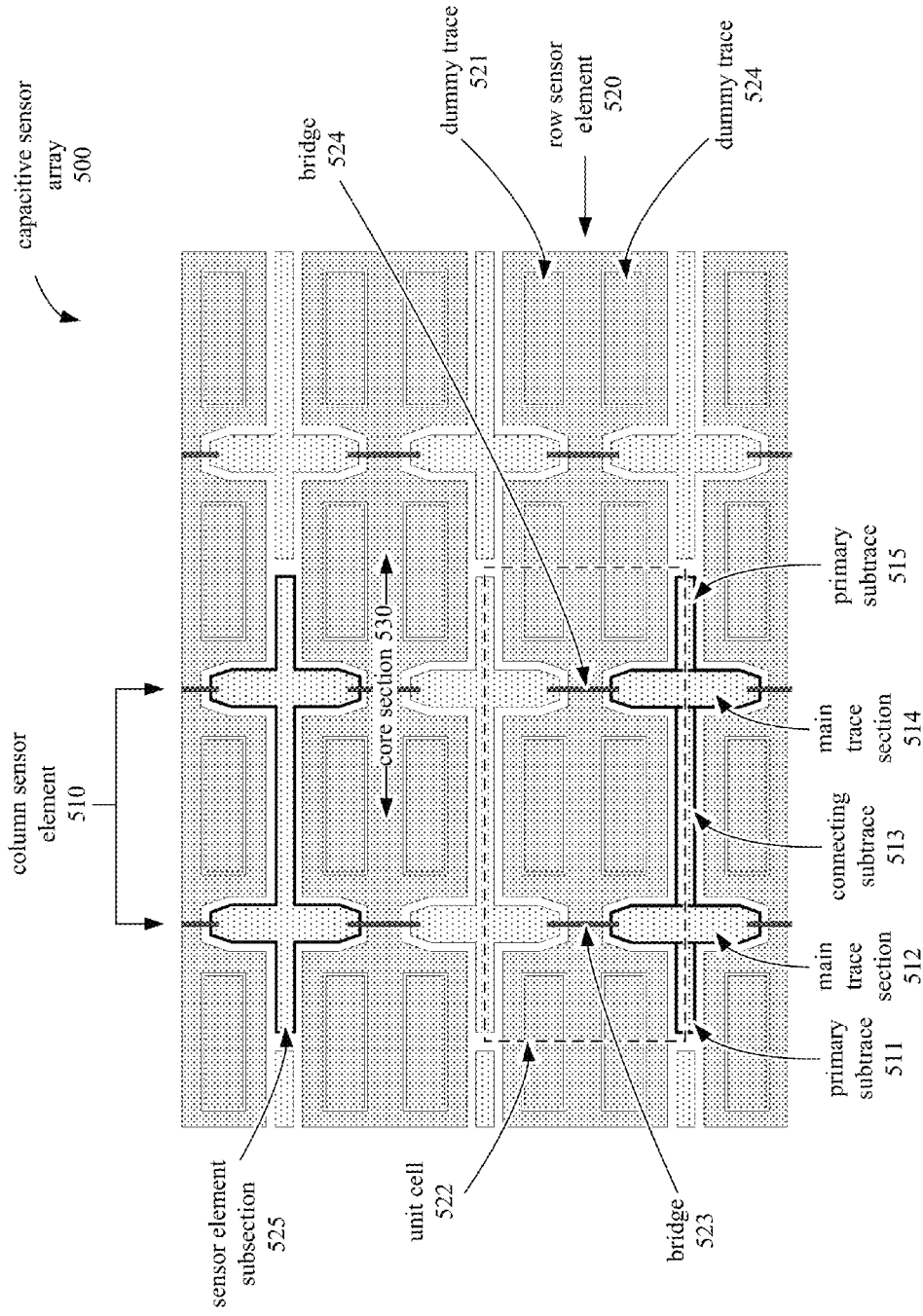
FIG. 5 illustrates a capacitive sensor array having a dual-pronged pattern, according to an embodiment.

FIG. 5 illustrates an embodiment of a capacitive sensor array 500 having a dual-pronged pattern. As illustrated in FIG. 5, subsections of sensor element 510, such as subsection 525, are connected together by a number of bridges, such as bridges 523 and 524. Each subsection of sensor element 510 includes at least two main trace sections 512 and 514 that are electrically connected by a connecting subtrace 513. Each subsection may also include one or more primary subtraces, such as subtrace 511 and 515, which may branch from each of the main trace sections 512 and 514.

In one embodiment, each unit cell includes within its area exactly two bridges. For example, unit cell 422 includes bridges 423 and 424, and unit cell 522 includes bridges 523 and 524. In alternative embodiments, each unit cell may include more or fewer bridges.

In one embodiment, the row and column sensor elements are constructed from a single layer of conductive material, such as indium tin oxide (ITO), and the bridges are used to connect separate sections of sensor elements, as described above. In an alternative embodiment, the sensor elements are constructed from two or more layers of conductive material, and bridges may be replaced by contiguous sections of the conductive material. In other words, for multiple layer sensor arrays, each sensor element may be constructed as a single section such that bridges are not necessary.

In one embodiment, the first and second main traces may be electrically connected by a connecting subtrace. For example, a connecting subtrace 413 is electrically connected to both of the main traces 412 and 413. In one embodiment, the main traces 412 and 413 are connected by a series of connecting subtraces. For example, in capacitive sensor array 400, the main traces 412 and 413 are electrically coupled by a connecting subtrace at least once within each unit cell through which the main traces 412 and 414 pass.

In one embodiment, the connecting subtraces increase a boundary length between a row and column sensor element, thus increasing the electric field interaction area. The connecting subtraces also provide redundancy in case of failure of a bridge, such as bridge 422 or 423. For example, if one of the bridges 422 or 423 is broken, both main traces are still connected through the remaining bridge and through the connecting subtraces.

In one embodiment, an axis along a length of the connecting subtrace 413 is perpendicular to an edge of the first main trace 412 and an edge of the second main trace 414. Alternatively, the axis along the length of the connecting subtrace 413 may be perpendicular to an axis along the length of one or both of the main traces 412 and 414.

In one embodiment, the second sensor element may also include at least one primary subtrace branching away from one of the first main trace or the second main trace. For example, column sensor element 410 includes a primary subtrace 411 branching away from the main trace 412. Sensor element 410 also includes a primary subtrace 415 that branches away from main trace 414.

In one embodiment, one or both of the primary subtraces may extend along the same axis as the length of a connecting subtrace. For example, primary subtraces 511 and 515 extend along a longitudinal axis of connecting subtrace 513.

In one embodiment, a capacitance sensor coupled with the capacitive sensor array may be configured to measure capacitances from the capacitive sensor array. For example, a capacitance sensor such as capacitance sensor 101 may be connected to the sensor array 400 or 500 and may measure mutual capacitances associated with the intersections between row and column sensor elements. For example, a capacitance sensor 101 may measure a mutual capacitance between sensor element 410 and sensor element 420.

In one embodiment, the capacitance sensor may be configured to measure the mutual capacitances between sensor elements by transmitting a signal on a TX sensor element and receiving a signal resulting from the capacitive coupling between sensor elements at an RX sensor element. For example, a capacitance sensor may use the row sensor element 420 as a TX sensor element and receive a resulting signal from sensor element 410 in order to measure the mutual capacitance between sensor elements 410 and 420. In one embodiment, the set of sensor elements having greater trace widths or lower resistances may be used as the TX sensor elements.

In one embodiment, the capacitive sensor array 400 may also include a plurality of dummy traces that are electrically isolated from the row and column sensor elements. In one embodiment, the dummy traces may be surrounded by portions of one set of sensor elements. For example, the dummy trace 421 may be surrounded by portions of row sensor element 420. Dummy traces such as dummy trace 421 increase the optical uniformity of the capacitive sensor array 400 for applications where the sensor array is transparent, such as touch-screens.

In one embodiment, the dummy traces also minimize the coupling of a finger or other conductive object to the sensor element in which the dummy traces are placed. For example, the dummy traces 521 and 524 may reduce coupling between a finger and row sensor element 520. In one embodiment, the dummy traces may be used to reduce finger coupling in TX sensor elements.

In one embodiment, a capacitive sensor array 400 may include a single row of dummy traces for each row sensor element 420, or may have approximately one dummy trace for each intersection between a column sensor element and a row sensor element. In one embodiment, a capacitive sensor array 500 may include a dual row of dummy traces, such as dummy traces 521 and 524. In one embodiment, the dummy traces may be arranged around a core section, such as core section 530, of the row sensor element. In one embodiment, the core section 530 is a relatively wide area of conductive material that serves as a path for current to flow through the sensor element. The dummy traces may be positioned outside of this path of current flow so that the dummy traces do not directly obstruct the flow of current and increase the resistance of the sensor element. For example, dummy traces 521 and 524 are positioned off the main longitudinal axis of row sensor element 520.

In one embodiment, the gaps between the sensor elements and dummy traces of the capacitive sensor arrays 400 and 500 have the same width. For example, these gaps may have a width of 0.030 mm for optical reasons. Electrical field interaction areas are formed around the gaps between the row and column sensor elements. The electrical field in these areas may be disturbed by the proximity of a finger or other conductive object, leading to a measurable change in capacitance.

In one embodiment, a capacitive sensor array, such as sensor array 400 or 500, may be constructed from a transparent conductive material, and laminated onto a transparent material such as glass. In one embodiment, the glass serves as both a substrate for the sensor elements and as a sensor overlay lens. The glass and sensor array assembly, also known as a sensor-on-lens (SOL), may further be used to overlay a display panel to implement a touch-screen.

Figure 6:
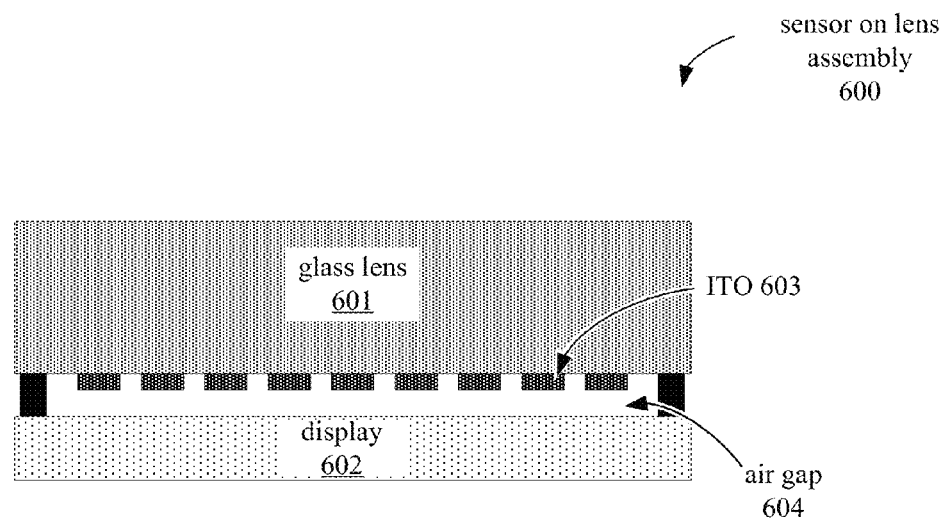
FIG. 6 illustrates an embodiment of a sensor on lens assembly including a dual-pronged capacitive sensor array.

FIG. 6 illustrates one embodiment of such a SOL assembly 600. SOL assembly 600 includes a glass lens 601 on which a sensor array made from ITO 603 is deposited. The glass lens 601 overlays a display 602, which may be an LCD, LED, or other type of display.

In one embodiment of a SOL assembly, the sensor array is deposited on only one side of the glass. Thus, sensor elements may be electrically isolated from each other by etching and insulation layers. In one embodiment, metal or ITO bridges may be used to connect subsections of sensor elements, such as subsection 525.

An air gap 604 separates the glass lens 601 and ITO 603 from the display 602. In one embodiment, the SOL assembly 600 does not require a shield between the ITO layer 603 and the display 602, particularly when noise from the display 602 does not interfere with operation of the sensor array.

Figure 7A:
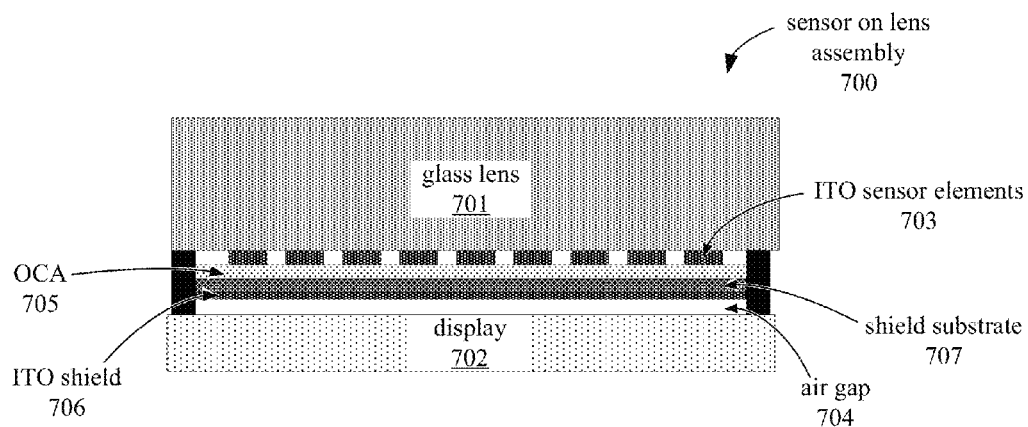
FIG. 7A illustrates an embodiment of a shielded sensor on lens assembly including a dual-pronged capacitive sensor array.

FIG. 7A illustrates an embodiment of a SOL assembly 700 including a capacitive sensor array such as sensor array 400 or 500. SOL assembly 700 includes a glass lens 701 onto which sense electrodes 703 of a capacitive sensor array, such as sensor array 400 or 500, is deposited. In one embodiment, the sense electrodes 703 may be constructed from ITO. SOL assembly 700 also includes a shield 706 facing away from the sense electrodes 703 to block noise from the display 702 from reaching the sense electrodes 703. In one embodiment, the shield 706 may be constructed from ITO laminated on a PET or glass substrate 707, then laminated onto the sensor.

In one embodiment, the sense electrodes 703 and the shield 706 are separated by the PET or glass used as the shield substrate and a layer of optically clear adhesive (OCA) 705. An air gap 704 may separate the shield from the display 702.

Figure 7B:
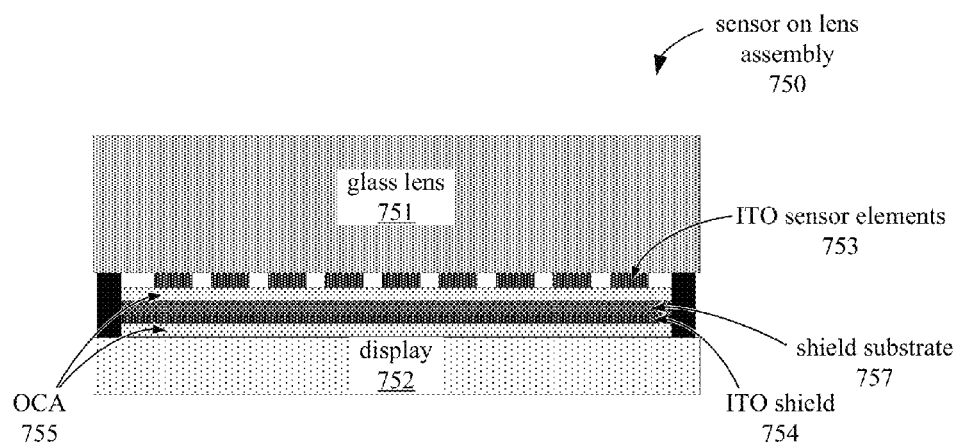
FIG. 7B illustrates an embodiment of a shielded sensor on lens assembly including a dual-pronged capacitive sensor array.

FIG. 7B illustrates an embodiment of a SOL assembly 750 including a capacitive sensor array such as sensor array 400 or 500. SOL assembly 750 includes a glass lens 751 onto which sense electrodes 753 of a capacitive sensor array, such as sensor array 400 or 500, is directly deposited. In one embodiment, the sense electrodes 753 may be constructed from ITO. SOL assembly 750 also includes a shield 754 on a shield substrate 757 facing away from the sense electrodes 753 to block noise from the display 752 from reaching the sense electrodes 753. In one embodiment, the shield substrate may be PET or glass.

In one embodiment, the sensor stack may be laminated directly onto the surface of display 752, such that the resulting stack-up does not include an air gap. The display 752, shield 754 and substrate 757 layers, and sensor elements 753 are bonded together with layers of OCA 755.

Figure 8:
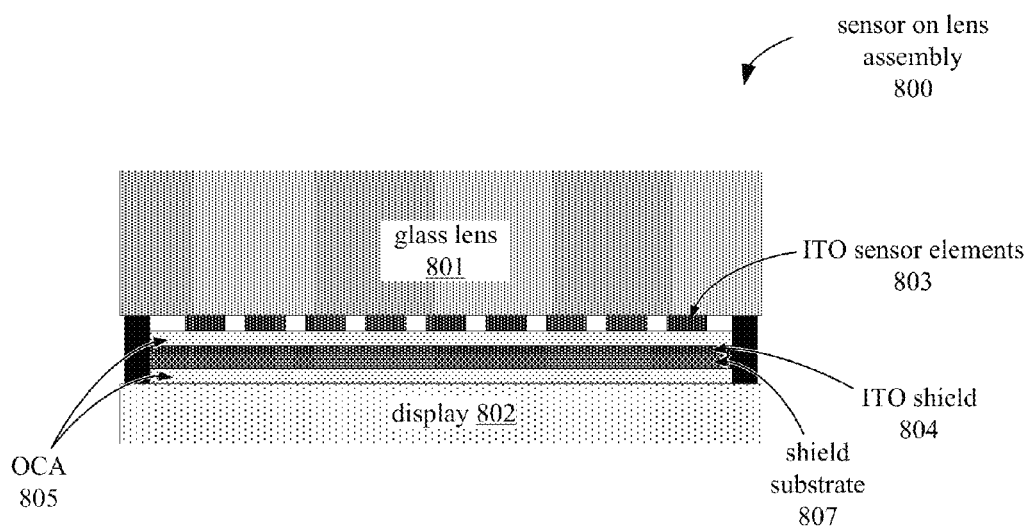
FIG. 8 illustrates an embodiment of a shielded sensor on lens assembly including a dual-pronged capacitive sensor array.

FIG. 8 illustrates an embodiment of a SOL assembly 800 including a capacitive sensor array such as sensor array 400 or 500. SOL assembly 800 includes a glass lens 801 onto which sense electrodes 803 of a capacitive sensor array, such as sensor array 400 or 500, is deposited. In one embodiment, the sense electrodes 803 may be constructed from ITO. SOL assembly 800 also includes a shield 804 on a shield substrate 807 facing toward (rather than away from) the sense electrodes 803 to block noise from the display 802 from reaching the sense electrodes 803. In one embodiment, the shield substrate may be PET or glass.

In one embodiment, the sensor stack may be laminated directly onto the surface of display 802, such that the resulting stack-up does not include an air gap. The display 802, shield 804 and substrate 807 layers, and sensor elements 803 are bonded together with layers of OCA 805.

Figure 9:
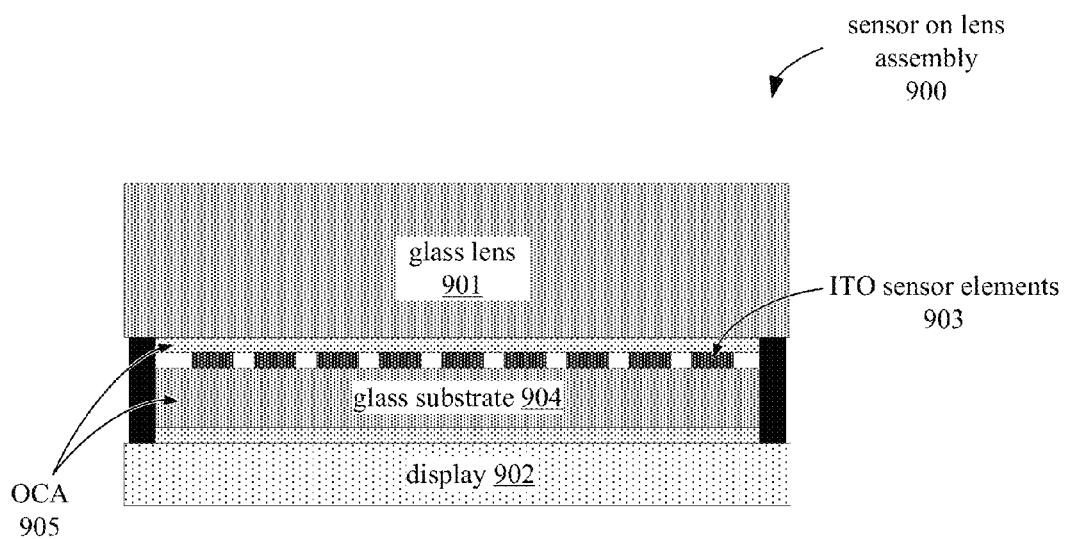
FIG. 9 illustrates an embodiment of a sensor on lens assembly.
Figure 5:
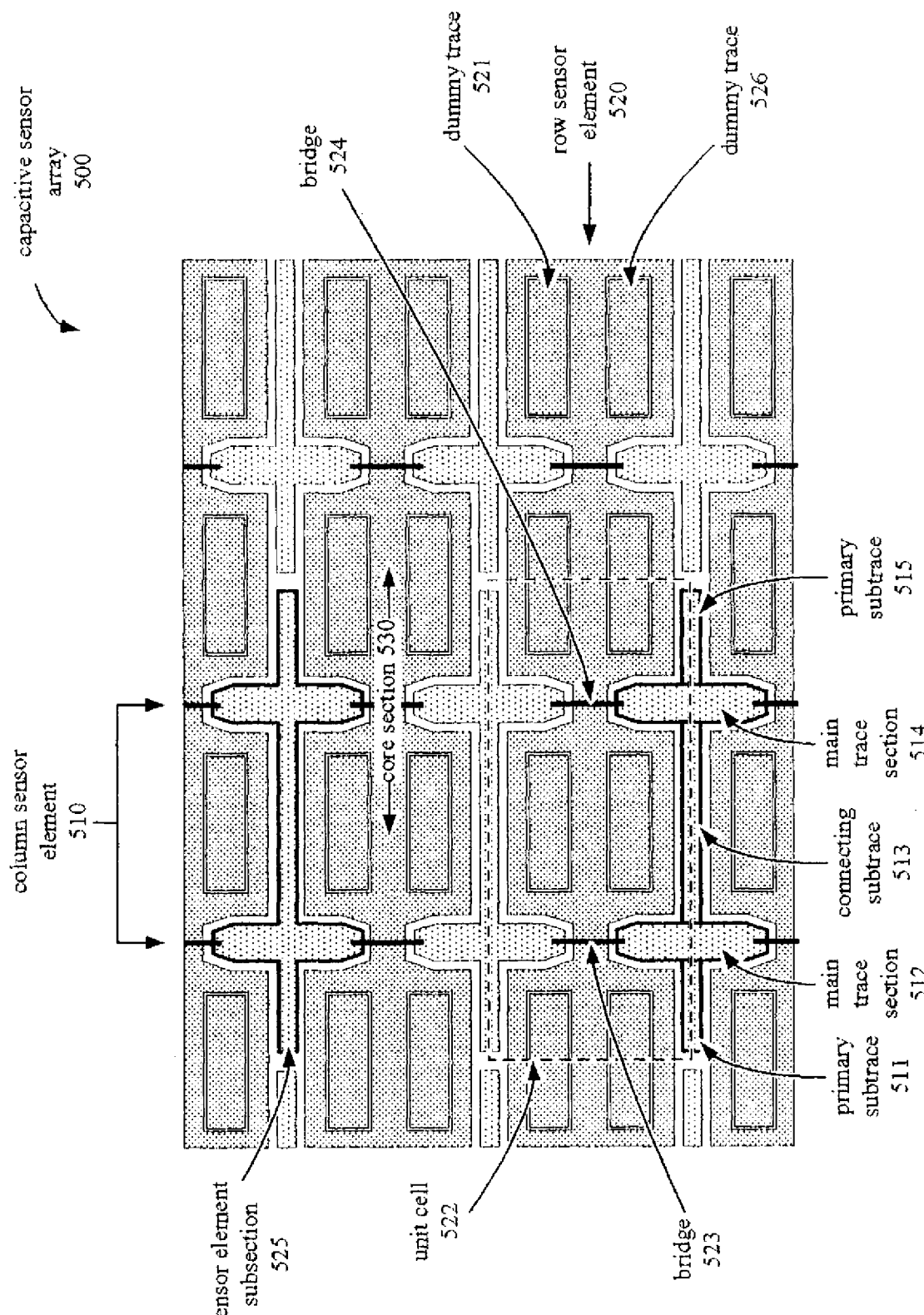
Figure 5:
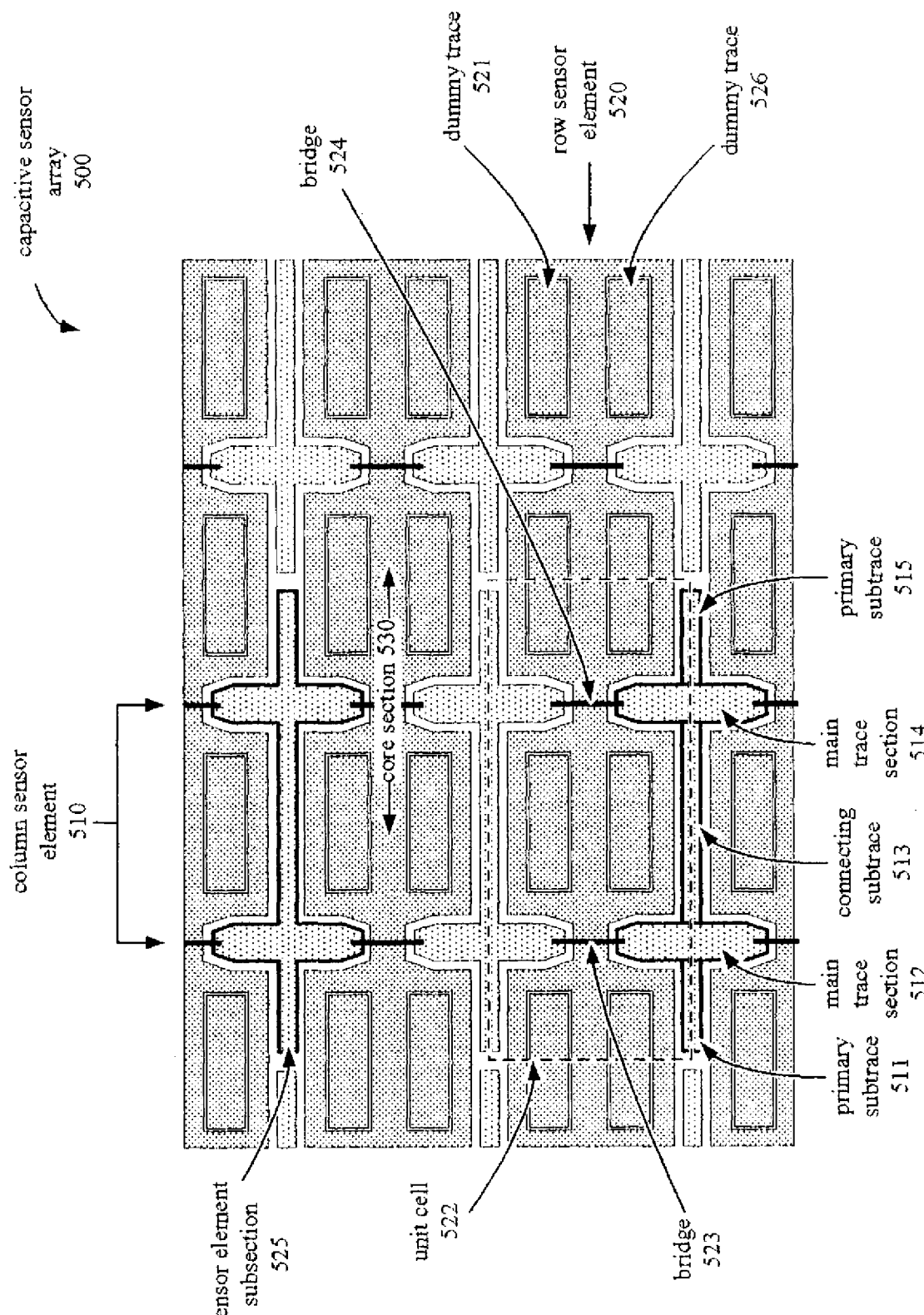

FIG. 9 illustrates an embodiment of a SOL assembly 900 including a capacitive sensor array such as sensor array 400 or 500. SOL assembly 900 includes a display 902 that is bonded to a glass substrate 904 by OCA 905. In one embodiment, sensor elements 903 are deposited on a top surface of the glass substrate 904, and a glass overlay lens 901 is bonded on top of the ITO sensor elements 903 using another layer of OCA 905.

In one embodiment, the sensor elements may be constructed from silver nano-wire films instead of ITO. In such embodiments, bridges used to connect sections of the sensor elements may be increased in thickness relative to bridges used with ITO, such that the chance of failure of the bridges by breaking is reduced.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A capacitive sensor array, comprising:
a first plurality of sensor elements; and
a second sensor element capacitively coupled with each of the first plurality of sensor elements, wherein the second sensor element comprises:
a first main trace and a second main trace, wherein the first main trace and the second main trace intersect each of the first plurality of sensor elements, wherein each of the first main trace and the second main trace cross at least one of a plurality of unit cells associated with the second sensor element, wherein each of the plurality of unit cells designates a set of locations nearer to an intersection between the second sensor element and a corresponding one of the first plurality of sensor elements than to any other intersection between sensor elements,
a connecting subtrace electrically coupled to both the first main trace and the second main trace, and
within each unit cell, at least one primary subtrace branching away from the first main trace or the second main trace.

2. The capacitive sensor array of claim 1, further comprising a plurality of bridges, wherein the first main trace and the second main trace comprise a plurality of trace sections connected together by the plurality of bridges.

3. The capacitive sensor array of claim 2, wherein the first sensor element and the second sensor element are constructed from a single layer, and wherein each of the plurality of bridges is situated at an intersection between the first sensor element and the second sensor element.

4. The capacitive sensor array of claim 1, wherein the at least one primary subtrace extends along a same axis as a length of the connecting subtrace.

5. The capacitive sensor array of claim 1, wherein an axis along a length of the connecting subtrace is perpendicular to an edge of the first main trace and an edge of the second main trace.

6. The capacitive sensor array of claim 1, further comprising one or more dummy traces electrically isolated from the first sensor element and the second sensor element, wherein the one or more dummy traces are each surrounded by portions of the second sensor element.

7. The capacitive sensor array of claim 6, wherein the one or more dummy traces are situated outside a path of current flow through a core section of the second sensor element.

8. The capacitive sensor array of claim 1, wherein the first sensor element and the second sensor element are laminated onto a transparent material.

9. An apparatus, comprising:
a capacitive sensor array, comprising:
a first plurality of sensor elements; and a second sensor element capacitively coupled with each of the first plurality of sensor elements, wherein the second sensor element comprises:
- a first main trace and a second main trace, wherein the first main trace and the second main trace intersect each of the first plurality of sensor elements, wherein each of the first main trace and the second main trace cross at least one of a plurality of unit cells associated with the second sensor element, wherein each of the plurality of unit cells designates a set of locations nearer to an intersection between the second sensor element and a corresponding one of the first plurality of sensor elements than to any other intersection between sensor elements,
- a connecting subtrace electrically coupled to both the first main trace and the second main trace, and
- within each unit cell, at least one primary subtrace branching away from the first main trace or the second main trace; and a capacitance sensor coupled with the capacitive sensor array, wherein the capacitance sensor is configured to measure capacitances of the capacitive sensor array.

10. The apparatus of claim 9, wherein the capacitance sensor is configured to measure the capacitances by transmitting a first signal on the second sensor element, and receiving a second signal from the first sensor element.

11. The apparatus of claim 9, wherein the capacitance sensor is further configured to measure capacitances of the capacitive sensor array by measuring a mutual capacitance associated with the intersection between the first sensor element and the second sensor element.

12. The apparatus of claim 9, further comprising a display panel, wherein the capacitive sensor array is constructed from a transparent conductive material, and wherein the capacitive sensor array overlays the display panel.

13. The apparatus of claim 9, further comprising a plurality of bridges, wherein first sensor element comprises a plurality of sections connected together by the plurality of bridges, wherein the first sensor element and the second sensor element are constructed from a single layer, and wherein each of the plurality of bridges is situated at an intersection between the first sensor element and the second sensor element.

14. The apparatus of claim 13, wherein two of the plurality of bridges are located within the unit cell.

15. The apparatus of claim 9, further comprising one or more dummy traces electrically isolated from the first sensor element and the second sensor element, wherein the one or more dummy traces are each surrounded by portions of the second sensor element.

16. The apparatus of claim 15, wherein the one or more dummy traces are situated outside a path of current flow through a core section of the second sensor element.

17. A capacitive sensor array, comprising:
- a first plurality of sensor elements; and
- a second sensor element intersecting each of the first plurality of sensor elements to form a plurality of unit cells, wherein each of the plurality of unit cells designates a set of locations nearer to an intersection between the second sensor element and a corresponding one of the first plurality of sensor elements than to any other intersection between sensor elements, wherein the second sensor element comprises a plurality of sensor element subsections, and wherein each sensor element subsection comprises:
  - a first main trace section,
  - a second main trace section,
  - a connecting subtrace electrically coupling the first main trace section and the second main trace section, and
  - a first primary subtrace branching from the first main trace section.

18. The capacitive sensor array of claim 17, wherein the sensor element subsections of the second sensor element are coupled together by a plurality of bridges.

19. The capacitive sensor array of claim 18, wherein each of the plurality of unit cells includes two of the plurality of bridges.

20. The capacitive sensor array of claim 17, further comprising a second primary subtrace branching from the second main trace section, wherein the first primary subtrace and the second primary subtrace are positioned along a same axis as a length of the connecting subtrace.

* * * * *

UNITED STATES PATENT AND TRADEMARK OFFICE
CERTIFICATE OF CORRECTION

| | |
|---|---|
| PATENT NO. | : 8,638,316 B2 |
| APPLICATION NO. | : 13/247867 |
| DATED | : January 28, 2014 |
| INVENTOR(S) | : Massoud Badaye |

It is certified that error appears in the above-identified patent and that said Letters Patent is hereby corrected as shown below:

The title page showing the illustrative figure should be deleted and replaced with the attached title page.

In the Drawings:

Sheet 6 of 10 consisting of Figure 5, should be deleted and replaced with the corrected Figure 5 as shown on the attached page.

In the Specification:

At column 9, line 50, "the dummy traces 521 and 524" should be "the dummy traces 521 and 526".

At column 9, line 60, "the dummy traces 521 and 524" should be "the dummy traces 521 and 526".

At column 10, lines 1-2, "the dummy traces 521 and 524" should be "the dummy traces 521 and 526".

In the Claims:

At column 12, claim 3, line 2, "sensor element" should be "plurality of sensor elements".

At column 12, claim 3, lines 4-5, "between the first sensor element" should be "between one of the first plurality of sensor elements".

At column 12, claim 6, line 3, "sensor element" should be "plurality of sensor elements".

At column 12, claim 8, line 2, "sensor element" should be "plurality of sensor elements".

Signed and Sealed this
Twenty-second Day of July, 2014

Michelle K. Lee
*Deputy Director of the United States Patent and Trademark Office*

CERTIFICATE OF CORRECTION (continued)
U.S. Pat. No. 8,638,316 B2

At column 13, claim 10, line 4, "the first sensor element" should be "one of the first plurality of sensor elements".

At column 13, claim 11, lines 4-5, "the intersection between the first sensor element" should be "each intersection between the first plurality of sensor elements".

At column 13, claim 13, line 2, "first sensor element" should be "each of the first plurality of sensor elements".

At column 13, claim 13, line 4, "first sensor element" should be "first plurality of sensor elements".

At column 13, claim 13, line 7, "the first sensor element" should be "one of the first plurality of sensor elements".

At column 14, claim 15, lines 2-3, "sensor element" should be "plurality of sensor elements".

(12) United States Patent
Badaye

(10) Patent No.: US 8,638,316 B2
(45) Date of Patent: Jan. 28, 2014

(54) TWO PRONG CAPACITIVE SENSOR PATTERN

(75) Inventor: Massoud Badaye, Sunnyvale, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 306 days.

(21) Appl. No.: 13/247,867

(22) Filed: Sep. 28, 2011

(65) Prior Publication Data
US 2012/0229417 A1   Sep. 13, 2012

Related U.S. Application Data

(60) Provisional application No. 61/452,006, filed on Mar. 11, 2011.

(51) Int. Cl.
*G06F 3/045*   (2006.01)

(52) U.S. Cl.
USPC ...... 345/174; 345/173; 178/18.06; 178/19.03

(58) Field of Classification Search
USPC ............. 345/156, 173, 174; 178/18.06, 19.03
See application file for complete search history.

(56) References Cited

U.S. PATENT DOCUMENTS

| | | | |
|---|---|---|---|
| 6,627,154 B1 * | 9/2003 | Goodman et al. | 422/82.01 |
| 7,663,607 B2 | 2/2010 | Hotelling et al. | |
| 7,920,129 B2 | 4/2011 | Hotelling et al. | |
| 7,940,251 B2 | 5/2011 | Hashida | |
| 7,965,281 B2 | 6/2011 | Mackey | |
| 8,217,916 B2 * | 7/2012 | Anno | 345/174 |
| 8,410,795 B1 * | 4/2013 | Peng et al. | 324/658 |
| 2002/0015024 A1 * | 2/2002 | Westerman et al. | 345/173 |
| 2002/0098119 A1 * | 7/2002 | Goodman | 422/82.01 |
| 2007/0139395 A1 | 6/2007 | Westerman et al. | |
| 2008/0225015 A1 | 9/2008 | Hashida | |

(Continued)

OTHER PUBLICATIONS

U.S. Appl. No. 13/172,749: "Self Shielding Capacitance Sensing Panel" Min Chin Chai et al., filed Jun. 29, 2011; 43 pages.
U.S. Appl. No. 13/198,717: "Lattice Structure for Capacitance Sensing Electrodes" Min Chin Chai et al., filed Aug. 5, 2011; 45 pages.
International Search Report for International Application No. PCT/US11/66509 dated Apr. 19, 2012; 2 pages.
USPTO Notice of Allowance for U.S. Appl. No. 13/172,749 dated Mar. 19, 2013; 10 pages.
USPTO Notice of Allowance for U.S. Appl. No. 13/172,749 dated May 9, 2013; 6 pages.
Written Opinion of the International Searching Authority for International Application No. PCT/US11/66509 mailed Apr. 19, 2012; 6 pages.

*Primary Examiner* — Joe H Cheng

(57) ABSTRACT

One embodiment of a capacitive sensor array may comprise a first plurality of sensor elements and a second sensor element capacitively coupled with each of the first plurality of sensor elements. The second sensor element may further comprise a first main trace and a second main trace, where the first main trace and the second main trace intersect each of the first plurality of sensor elements, and where each of the main traces cross at least one of a plurality of unit cells associated with the second sensor element. The second sensor element may also comprise a connecting subtrace electrically coupled to both the first main trace and the second main trace, and within each unit cell, at least one primary subtrace branching away from the first main trace or the second main trace.

20 Claims, 10 Drawing Sheets

UNITED STATES PATENT AND TRADEMARK OFFICE
CERTIFICATE OF CORRECTION

Page 1 of 4

| | |
|---|---|
| PATENT NO. | : 8,638,316 B2 |
| APPLICATION NO. | : 13/247867 |
| DATED | : January 28, 2014 |
| INVENTOR(S) | : Massoud Badaye |

It is certified that error appears in the above-identified patent and that said Letters Patent is hereby corrected as shown below:

The title page showing the illustrative figure should be deleted and replaced with the attached title page.

In the Drawings:

Sheet 6 of 10 consisting of Figure 5, should be deleted and replaced with the corrected Figure 5 as shown on the attached page.

In the Specification:

At column 9, line 50, "the dummy traces 521 and 524" should be "the dummy traces 521 and 526".

At column 9, line 60, "the dummy traces 521 and 524" should be "the dummy traces 521 and 526".

At column 10, lines 1-2, "the dummy traces 521 and 524" should be "the dummy traces 521 and 526".

In the Claims:

At column 12, claim 3, line 43, "sensor element" should be "plurality of sensor elements". (Both occurrences)

At column 12, claim 3, lines 45-46, "between the first sensor element" should be "between one of the first plurality of sensor elements".

This certificate supersedes the Certificate of Correction issued July 22, 2014.

Signed and Sealed this
Sixteenth Day of September, 2014

Michelle K. Lee
*Deputy Director of the United States Patent and Trademark Office*

CERTIFICATE OF CORRECTION (continued)
U.S. Pat. No. 8,638,316 B2

At column 12, claim 6, line 56, "sensor element" should be "plurality of sensor elements". (Both occurrences)

At column 12, claim 8, line 63, "sensor element" should be "plurality of sensor elements". (Both occurrences)

At column 13, claim 10, line 25, "the first sensor element" should be "one of the first plurality of sensor elements".

At column 13, claim 11, lines 30-31, "the intersection between the first sensor element" should be "each intersection between the first plurality of sensor elements".

At column 13, claim 13, line 37, "first sensor element" should be "each of the first plurality of sensor elements".

At column 13, claim 13, line 39, "first sensor element" should be "first plurality of sensor elements".

At column 13, claim 13, line 42, "the first sensor element" should be "one of the first plurality of sensor elements".

At column 14, claim 15, lines 4-5, "sensor element" should be "plurality of sensor elements".

(12) United States Patent
Badaye

(10) Patent No.: US 8,638,316 B2
(45) Date of Patent: Jan. 28, 2014

(54) TWO PRONG CAPACITIVE SENSOR PATTERN

(75) Inventor: Massoud Badaye, Sunnyvale, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 306 days.

(21) Appl. No.: 13/247,867

(22) Filed: Sep. 28, 2011

(65) Prior Publication Data
US 2012/0229417 A1    Sep. 13, 2012

Related U.S. Application Data

(60) Provisional application No. 61/452,006, filed on Mar. 11, 2011.

(51) Int. Cl.
*G06F 3/045* (2006.01)

(52) U.S. Cl.
USPC ...... 345/174; 345/173; 178/18.06; 178/19.03

(58) Field of Classification Search
USPC ............ 345/156, 173, 174; 178/18.06, 19.03
See application file for complete search history.

(56) References Cited

U.S. PATENT DOCUMENTS

| | | | | |
|---|---|---|---|---|
| 6,627,154 B1* | 9/2003 | Goodman et al. | ......... | 422/82.01 |
| 7,663,607 B2 | 2/2010 | Hotelling et al. | | |
| 7,920,129 B2 | 4/2011 | Hotelling et al. | | |
| 7,940,251 B2 | 5/2011 | Hashida | | |
| 7,965,281 B2 | 6/2011 | Mackey | | |
| 8,217,916 B2* | 7/2012 | Anno | ............... | 345/174 |
| 8,410,795 B1* | 4/2013 | Peng et al. | ............ | 324/658 |
| 2002/0015024 A1* | 2/2002 | Westerman et al. | ......... | 345/173 |
| 2002/0098119 A1* | 7/2002 | Goodman | ............... | 422/82.01 |
| 2007/0139395 A1 | 6/2007 | Westerman et al. | | |
| 2008/0225015 A1 | 9/2008 | Hashida | | |

(Continued)

OTHER PUBLICATIONS

U.S. Appl. No. 13/172,749: "Self Shielding Capacitance Sensing Panel" Min Chin Chai et al., filed Jun. 29, 2011; 43 pages.
U.S. Appl. No. 13/198,717: "Lattice Structure for Capacitance Sensing Electrodes" Min Chin Chai et al., filed Aug. 5, 2011; 45 pages.
International Search Report for International Application No. PCT/US11/66509 dated Apr. 19, 2012; 2 pages.
USPTO Notice of Allowance for U.S. Appl. No. 13/172,749 dated Mar. 19, 2013; 10 pages.
USPTO Notice of Allowance for U.S. Appl. No. 13/172,749 dated May 9, 2013; 6 pages.
Written Opinion of the International Searching Authority for International Application No. PCT/US11/66509 mailed Apr. 19, 2012; 6 pages.

*Primary Examiner* — Joe H Cheng

(57) ABSTRACT

One embodiment of a capacitive sensor array may comprise a first plurality of sensor elements and a second sensor element capacitively coupled with each of the first plurality of sensor elements. The second sensor element may further comprise a first main trace and a second main trace, where the first main trace and the second main trace intersect each of the first plurality of sensor elements, and where each of the main traces cross at least one of a plurality of unit cells associated with the second sensor element. The second sensor element may also comprise a connecting subtrace electrically coupled to both the first main trace and the second main trace, and within each unit cell, at least one primary subtrace branching away from the first main trace or the second main trace.

20 Claims, 10 Drawing Sheets